US009741271B2

(12) United States Patent
Tait et al.

(10) Patent No.: US 9,741,271 B2
(45) Date of Patent: Aug. 22, 2017

(54) FLEXIBLY SUPPORTED VIDEO DISPLAY

(75) Inventors: Michael Tait, Lititz, PA (US); Adam Davis, Lancaster, PA (US); James Fairorth, Lancaster, PA (US)

(73) Assignee: Tait Towers Manufacturing, LLC, Lititz, PA (US)

( * ) Notice: Subject to any disclaimer, the term of this patent is extended or adjusted under 35 U.S.C. 154(b) by 1458 days.

(21) Appl. No.: 12/405,491

(22) Filed: Mar. 17, 2009

(65) Prior Publication Data

US 2009/0290076 A1 Nov. 26, 2009

Related U.S. Application Data

(60) Provisional application No. 61/054,524, filed on May 20, 2008.

(51) Int. Cl.

| | |
|---|---|
| ***H04N 5/64*** | (2006.01) |
| ***G09F 9/33*** | (2006.01) |
| ***G09F 19/22*** | (2006.01) |

(52) U.S. Cl.

CPC ................ *G09F 9/33* (2013.01); *G09F 19/22* (2013.01); *G09F 19/226* (2013.01)

(58) Field of Classification Search

CPC .................................................. G09G 2380/02
USPC .......................... 348/836; 362/404, 409, 559
See application file for complete search history.

(56) References Cited

U.S. PATENT DOCUMENTS

| | | | | |
|---|---|---|---|---|
| 2,547,531 | A | 4/1951 | Melvin et al. | |
| 3,735,513 | A * | 5/1973 | Constant et al. | 40/472 |
| 3,782,065 | A | 1/1974 | Griffing | |
| 4,005,536 | A * | 2/1977 | Fanning, Jr. | 40/533 |
| 5,181,777 | A * | 1/1993 | Segill et al. | 362/405 |
| 5,576,687 | A | 11/1996 | Blank et al. | |
| 5,653,339 | A * | 8/1997 | Dobson | 206/420 |
| 5,900,850 | A * | 5/1999 | Bailey | G09F 9/33 340/815.83 |
| 5,957,564 | A * | 9/1999 | Bruce et al. | 362/84 |
| 6,026,626 | A * | 2/2000 | Fisher | 52/633 |
| 6,263,602 | B1 | 7/2001 | Sieber et al. | |
| 6,704,989 | B1 | 3/2004 | Lutz et al. | |
| 7,029,145 | B2 * | 4/2006 | Frederick | 362/234 |
| 7,066,618 | B1 * | 6/2006 | Little | 362/147 |
| 7,086,190 | B2 * | 8/2006 | Voluckas | 40/617 |
| 2004/0009729 | A1 * | 1/2004 | Hill et al. | 442/208 |
| 2004/0173489 | A1 * | 9/2004 | Knight et al. | 206/419 |
| 2004/0212552 | A1 | 10/2004 | Hung | |

(Continued)

FOREIGN PATENT DOCUMENTS

| | | | |
|---|---|---|---|
| EP | 0101805 | A1 | 6/1983 |
| GB | 2262765 | | 6/1993 |

OTHER PUBLICATIONS

"Cable Grippers Inc. 2006 Catalog"; May 17, 2007 (from wayback machine capture date); Cable Grippers Inc.; available at https://web.archive.org/web/20070517173558/http://www.cablegrippers.com/diagrams.html.*

*Primary Examiner* — Jeremaiah C Hallenbeck-Huber
(74) *Attorney, Agent, or Firm* — McNees Wallace & Nurick LLC

(57) ABSTRACT

A method of displaying a video display system, assembling a video display system, and a video display system are disclosed. The video display system can include a flexible support, a display device detachably engaged to the flexible support, and a coupling device engaged to the flexible support and the display device at a first location on the display device.

18 Claims, 8 Drawing Sheets

(56) References Cited

U.S. PATENT DOCUMENTS

| | | | | |
|---|---|---|---|---|
| 2005/0178036 | A1* | 8/2005 | Henick et al. | 40/617 |
| 2005/0219171 | A1* | 10/2005 | Gimbutas | 345/82 |
| 2006/0039142 | A1* | 2/2006 | Temple | G09F 9/33 362/231 |
| 2006/0093900 | A1* | 5/2006 | Yan et al. | 429/111 |
| 2006/0197474 | A1* | 9/2006 | Olsen | 315/312 |
| 2006/0261228 | A1 | 11/2006 | Hung | |
| 2006/0284151 | A1* | 12/2006 | Hossler | 254/278 |
| 2007/0182666 | A1* | 8/2007 | Hochman et al. | 345/46 |
| 2008/0007181 | A1* | 1/2008 | Pickering | 315/82 |
| 2009/0146918 | A1* | 6/2009 | Kline | G09F 9/33 345/46 |
| 2009/0256975 | A1* | 10/2009 | Anderson et al. | 348/836 |

* cited by examiner

FLEXIBLY SUPPORTED VIDEO DISPLAY

CROSS REFERENCE TO RELATED PATENT APPLICATIONS

This application claims the benefit of U.S. Provisional Application No. 61/054,524, filed May 20, 2008, which is hereby incorporated by reference in its entirety.

FIELD OF THE INVENTION

The present invention relates to video displays. More specifically, the present invention relates to video displays employing flexible supports.

BACKGROUND OF THE INVENTION

In the performance industry, video displays are used in conjunction with multi-media systems utilized in productions. Video displays can be limited in size due to the complexity of arranging the video displays and/or due to the issues associated with weight distribution.

When being used as part of a touring production, video displays are often consolidated and stored for transportation. Known systems are rigid and require significant time for arranging (for example, consolidating, disassembling, and assembling). The video displays may be assembled by individuals of varying level of skill. The arranging of these video displays may require complex diagrams, may require several tools, and may be difficult to repair or replace.

In addition to limiting methods of arranging the video displays, rigidity may prevent aesthetic benefits associated with flexibility. Known systems do not adequately provide three-dimensional displays of two-dimensional videos and do not adequately permit rotation of displays. Also, known systems do not adequately permit video displays to be flexibly manipulated and/or rotated.

When video displays are partially assembled or fully assembled, inconsistent and/or undesired weight distribution can limit the size of the video displays. If the weight distribution puts stress on connectors in the video display, then the connectors can fail. Failure of connectors may result in failure of the video display.

Therefore, there is an unmet need to provide a video display, a method of displaying video, and a method of arranging a video display that may be more easily arranged, may be more flexible, and/or may selectably distribute weight.

SUMMARY OF THE INVENTION

The present invention relates to a video display system including a flexible support, a clipping member, and a display device. In the embodiment, the display device is detachably engaged to the flexible support with the clipping device, the clipping device selectively distributes the weight of the display device at a first location on the flexible support.

The present invention also relates to a method for displaying a video display including providing a flexible support, a display device, and a clipping device, illuminating the display device, and selectively distributing weight of the display device at a first location on the flexible support. In the embodiment, the clipping device detachably engages the display device to the flexible support at the first location.

The present invention also relates to a method of arranging a video display system including providing a flexible support, a display device, and a coupling device, engaging the coupling device thereby attaching the flexible support to the display device at a first location, selectively distributing weight of the display device to the first location, and advancing the flexible support to permit a second display device to be attached to the flexible support at a second location.

An advantage of the present disclosure is decreasing the number and type of tools required for assembly.

Another advantage of the present disclosure is the ability to have a flexible display component capable of being flexibly manipulated, while retaining the desired display characteristics.

Yet another advantage of the present disclosure is selectable distribution of weight, permitting the flexible display to provide an assembled set of display components that is large. Flexible displays according to the disclosure may extend tens or hundreds of feet in multiple dimensions.

Yet another advantage of the present disclosure is the reduction or elimination of the need for vertical supports within display devices, thereby significantly reducing the weight of the overall system.

Yet another advantage of the present disclosure is faster, more accurate assembly. In addition, assembly may be accomplished with personnel having little or no technical skill.

Further aspects of the method and system are disclosed herein. The features as discussed above, as well as other features and advantages of the present disclosure will be appreciated and understood by those skilled in the art from the following detailed description and drawings.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
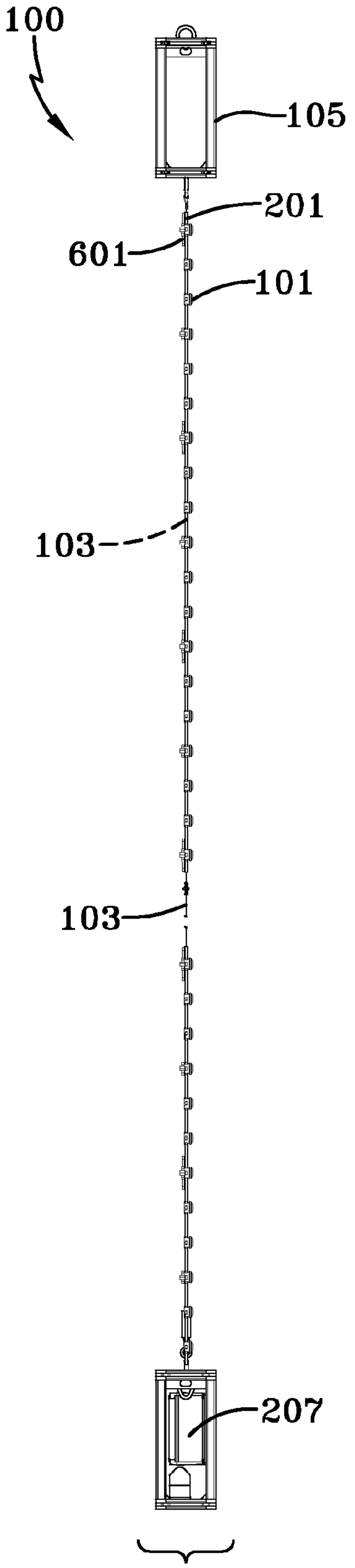
FIG. 1 illustrates a side view of an exemplary embodiment of a video display system.
Figure 2:
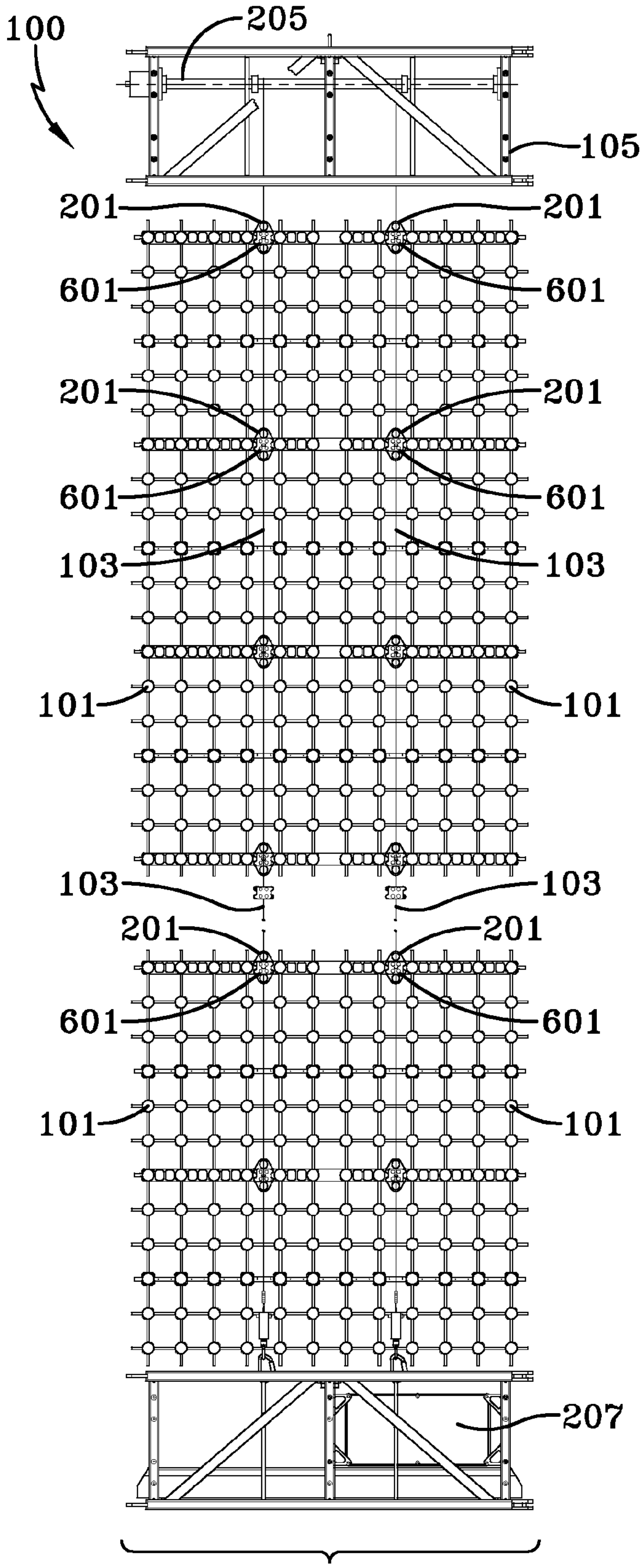
FIG. 2 illustrates a front view of another exemplary embodiment of a video display system.

Referring to FIGS. 1 and 2, a video display system 100 includes a flexible support 103, a display device 101 detachably engaged to flexible support 103, and a coupling device (shown as a clipping mechanism 601) engaged to flexible support 103 and display device 101 at a first location 201 on display device 101. The arrangement of system 100 can provide selective distribution of weight of display device 101 at first location 201.

Flexible support 103 can be a cable or cables configured to enable system 100 to be suspended from an architectural members 105. While flexible support 103 is being described as a cable or cables, the disclosure is not so limited. Flexible support 103 may be any elongate, flexible structure capable of bearing significant weight. For example, suitable flexible supports 103 may include, but are not limited to, flexible tapes, ropes, wires, or any other suitable flexible structure. Architectural member 105 may be a steel beam, an existing stage system, another cables, a bridge, a wall, a telephone post, a trestle, a truss, or any other suitable type of architectural system. In one embodiment, flexible support 103 can be two weight-bearing cables suspended from architectural member 105. Weight bearing cables can be arranged such that display device 101, for example panels or other suitable light emitting devices, may be suspended from architectural member 105. Flexible support 103 may be attached to architectural member 105 in any suitable manner. In an exemplary embodiment, flexible support 103 may be high strength cables capable of supporting the weight of panels and any additional equipment or components below architectural member 105. In one embodiment, although not so limited, the cable is aircraft grade cable having an outer diameter of about ⅛ inch.

In another embodiment, flexible support 103 may include power and/or signal functionality. For example, flexible support 103 may be one or more communication and/or power providing cables, such as fiber optic or copper-based wires or cables, or Ethernet cables. The use of flexible support 103 can reduce the amount of weight in the system by removing bulky structural support systems like intermediate trusses. In addition, the use of flexible support 103 can permit flexibility for additional display options, such as rotating, bending, rounding, or flapping. For example, a rounded visual display may be formed using flexible support 103. In addition, the ability for flexible support 103 to curve can permit a display of a fixed image in motion, such as a flag appearing to wave in the wind. In another embodiment, system 100 can be moved by the motor or other device thereby creating a three-dimensional effect of the displayed image.

Referring to FIG. 2, flexible support 103 may be wires, such as power cords, run along-side cables and connected to a controller 207. In one embodiment, the wires and the cables may be integrated. In another embodiment, the wires may be integrated by being circumferentially bounded by cables thereby forming flexible support 103. In another embodiment, wires may act as flexible support 103.

System 100 of the present disclosure can be portable, allowing easy assembly and disassembly. Flexible support 103 can be detachably engaged to display device 101 by the coupling device, such as clipping mechanism 601. Assembly of system 100 can be easily done by manually or automatically mounting or detachably engaging the display device onto the flexible supports. In one embodiment, display device 101 may be attached to flexible support 103 at first location 201, flexible support 103 may be advanced thereby permitting a second display device 101 to be attached at another first location 201. The advancing of flexible support 103 may be incremental or constant. The sequential attaching and/or detaching of first display device 101, second display device 101, and any additional display devices 101 may permit use of fewer tools for stabilizing system 100 while partially arranged. The sequential attaching and/or detaching may permit fewer individuals to arrange system 100, may provide additional protection during arrangement of system 100, and may permit transportation of system 100. The advancing and the attaching can be repeated to arrange a desired number of display devices 101. While partially assembled and while fully assembled, system 100 can provide selective distribution of weight from display device(s) 101 to flexible support 103. The term "selective distribution" as utilized herein means a consolidation of the weight of the individual display devices 101 at one or a few first locations 201. In one embodiment, the selective distribution consolidates the weight of each display device 101 onto locations along flexible support 103 such that the flexible supports 103 bear the weight of all of the display devices 101. The selective distribution of weight permits the display devices to have less support structure within themselves and permits large numbers of display devices 101 to be assembled vertically.

In one embodiment, the advancing of the flexible supports 103 may be performed by a winding mechanism 205. System 100 can be raised by use of a motor and winding mechanism 205 (for example, a chain motor). In another embodiment, architectural member 105 may additionally and/or alternatively be raised. The ability to raise and lower system 100, including raising and lowering of portions of system 100 may permit incremental arrangement of display devices 101, for example, incremental assembly, disassembly, and/or consolidation of display devices 101. That is, display devices 101 may be attached to flexible support 103 at ground level and then lifted to the operational height. In one embodiment, display device 101 may be lifted from storage cart 901 (see FIG. 9) and manually or automatically mounted on flexible support 103. Use of cart 901 permits consolidated storage and/or transportation, as well as a quick assembly of system 100. for more consolidated storage or transportation. In another embodiment, each of display devices 101 may be separately stored and transported for engagement of flexible support 103 at a new location.

Controller 207 may be located in architectural member 105, for example, above or below display device 101. In another embodiment, the controller 207 may be remote to the system 100 and/or integrated into the controls of a theatrical performance. Controller 207 may be electrically connected to display device 101 thereby permitting power and/or signals to travel to display device 101. In one embodiment, controller 207 may be housed in any suitable architectural structure inside or outside system 100. Optional support members 203 may provide a desired stiffness to certain portions of panel 101 and may provide additional support horizontally and or vertically for display device 101. The selective distribution of the weight of the display devices 101 reduces or eliminates the need for support members 203 in a vertical direction (for example, the direction parallel to the flexible supports).

Figure 3:
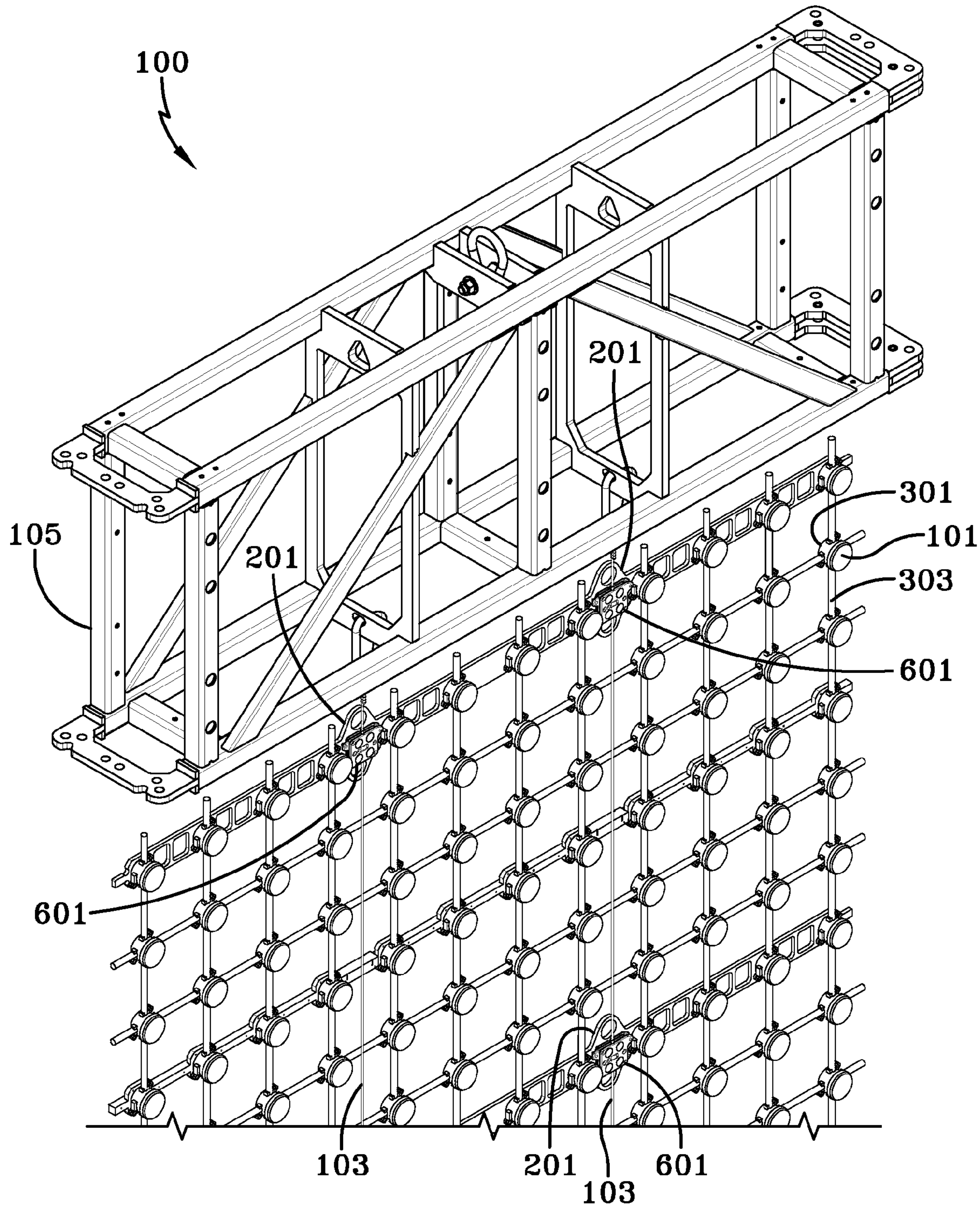
FIG. 3 illustrates a partial perspective view of another exemplary embodiment of a video display system.
Figure 4:
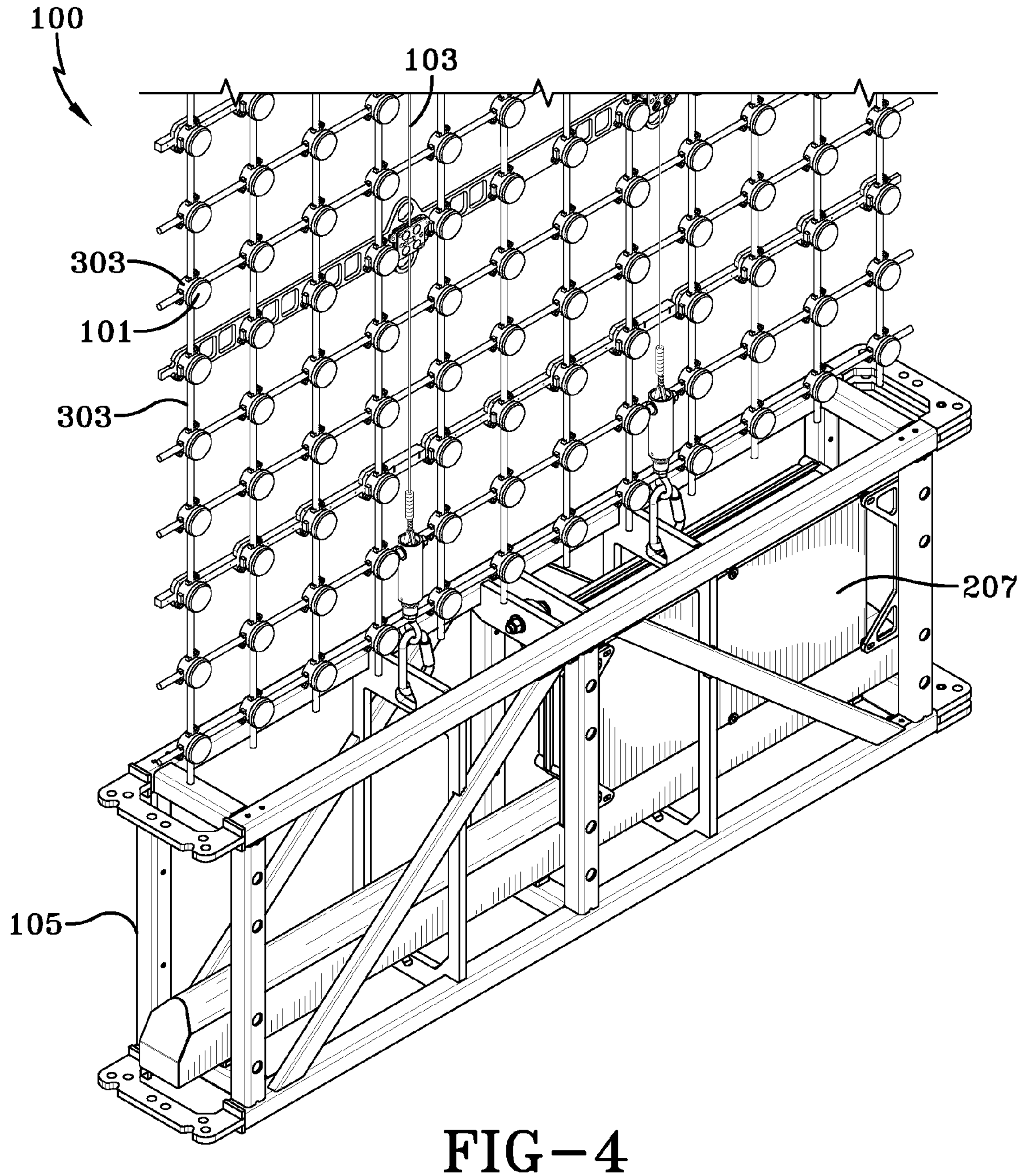
FIG. 4 illustrates a partial perspective view of another exemplary embodiment of a video display system.

Referring to FIGS. 3 and 4, display device 101 can be one or more light emitting devices. For example, the light emitting devices may be light emitting diodes (LEDs) housed within a housing 301 that may be transparent, translucent, semi-transparent, semi-translucent, or a combination thereof. In one embodiment, the LEDs may be configured to emit colored light based upon a signal from controller 207. In another embodiment, the light emitting devices may emit a single color of light. In another embodiment, the light emitting devices may emit multiple colors of light simultaneously or at different times. In yet another embodiment, multiple LEDs may be housed within the same housing 301. In yet another embodiment, with the multiple LEDs housed in the same housing 301, LEDs configured to emit multiple colors such that the different colors are mixed within housing 301 thereby permitting additional control of the image or series of images displayed.

In one embodiment, the light emitting devices may be connected to each other in a grid pattern of wires 303. Wires 303 may be connected to the light emitting devices by any suitable technique or connector. Wires 303 can provide support for adjacent light emitting devices within display device 101. Wires 303 can be arranged in conjunction with flexible support 103 to provide selective distribution of weight of display device 101. In another embodiment, the light emitting devices may be connected with wires 303 that are fiber optic cables permitting the light to be emitted from various sources. In yet another embodiment, wires 303 may be translucent, transparent, semi-transparent, semi-translucent, semi-opaque, opaque, or combinations thereof. In another embodiment, system 100 may utilize wireless control and/or wireless power to provide control and power from a remote location, providing reduced weight and greater portability.

Figure 5A:
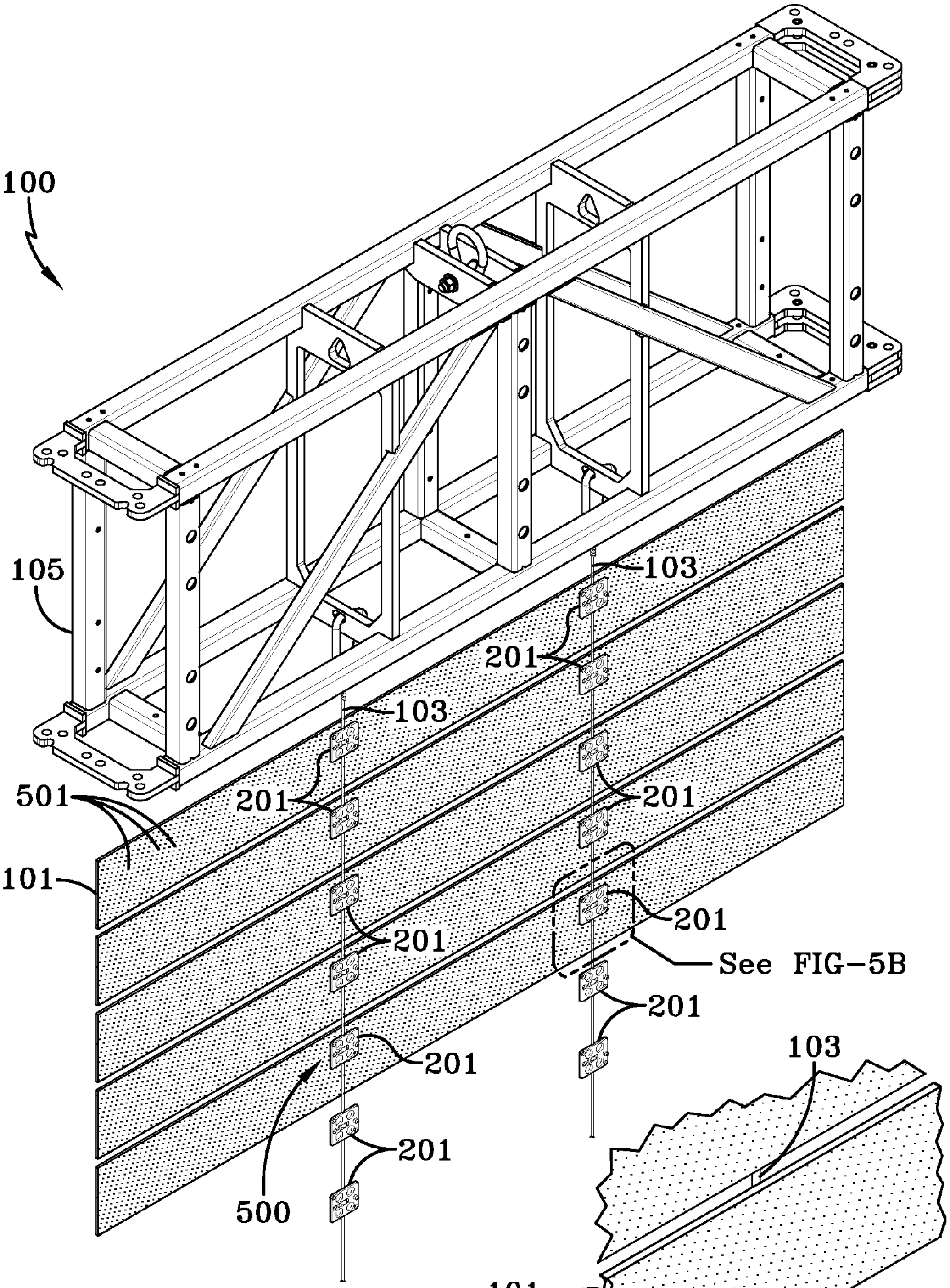
FIG. 5A illustrates a partial perspective view of another exemplary embodiment of a video display system.
Figure 5B:
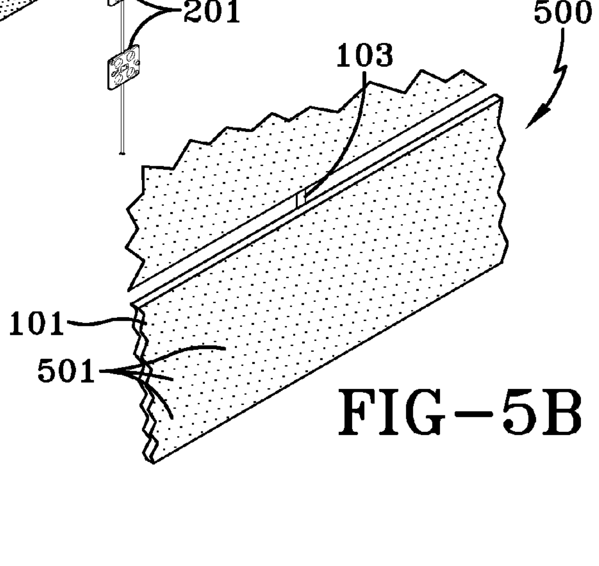
FIG. 5B illustrates a reverse view of a portion of FIG. 5A.
Figure 11:
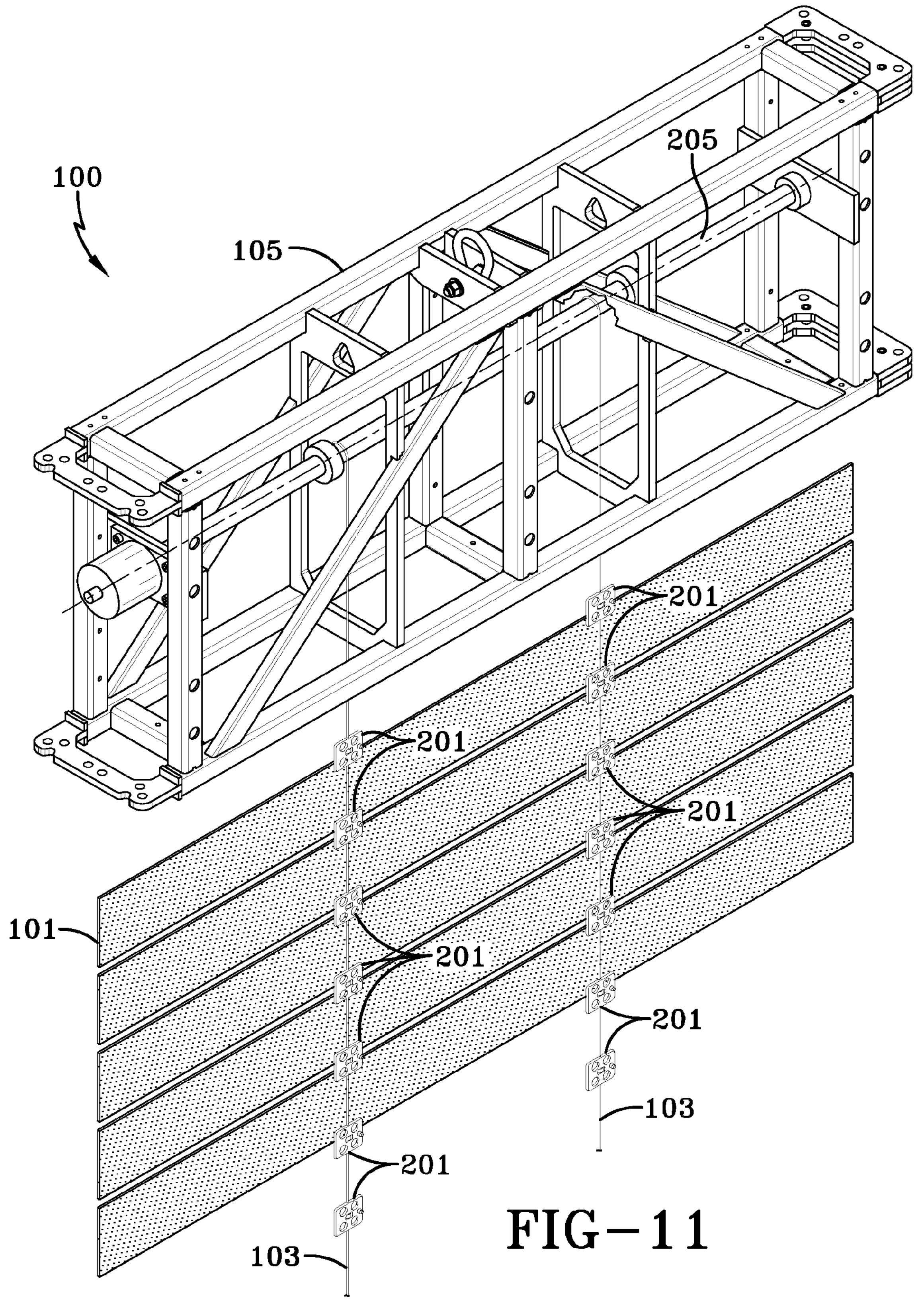
FIG. 11 illustrates a perspective view of another exemplary embodiment of a video display system.

Referring to FIG. 5A, display device 101 can be a panel (for example, a low or high resolution LED panel) configured to display lighting and/or video presentations. The panel can be attached onto portions or the entire system 100. In one embodiment, a large number of closely spaced LEDs 501 may be included thereby creating the effect that LEDs 501 are of high resolution. In another embodiment, the panels may additionally or alternatively include Organic Light Emitting Diodes ("OLEDs") or other light sources capable of displaying images, video, or other visual displays. The panels may be attached to various portions of system 101. The panels can be semi-translucent, semi-transparent, transparent, translucent, semi-opaque, opaque, or combinations. In addition, LEDs 501 may be connected by electrical and/or control wires or other connectors with or without additional structural support. In one embodiment, panels may permit high resolution including a large number of colored, closely spaced pixels permitting a clear, high resolution image, series of images, and/or video. Referring to FIG. 5B, which shows a reverse view of region 500 in FIG. 5A, the flexible supports 103 and clipping mechanism 601 provide selective distribution of the weight of the individual panels. The configuration according to the disclosure permits large numbers of panels to be assembled into system 100 with little additional support structure. In addition, the use of the flexible support 103 and clipping mechanism 601 allows large numbers of panels to be assembled into system 100 quickly and accurately. Referring to FIG. 11, display devices 101 can be positioned with clipping mechanisms 601 adjacent to an additional display device 101. In this embodiment, additional rigidity can be provided but weight distribution may not be selectively distributed as in the embodiment shown in FIG. 5A.

In one embodiment, display device 101 may be powered by individual batteries housed with LEDs or other light sources. In another embodiment, LED can have a battery power source and another LED can use the battery as a power source by having wires carrying power from other LEDs.

Another embodiment includes OLEDs as LEDs. OLEDs may reduce power requirements and permit longer operation on the same charge. OLEDs may permit display device 101 to run on the same charge for a long period of time, for example, by providing power to the OLEDs and then disconnecting the power source from the OLEDs, and then displaying the system.

Figure 6:
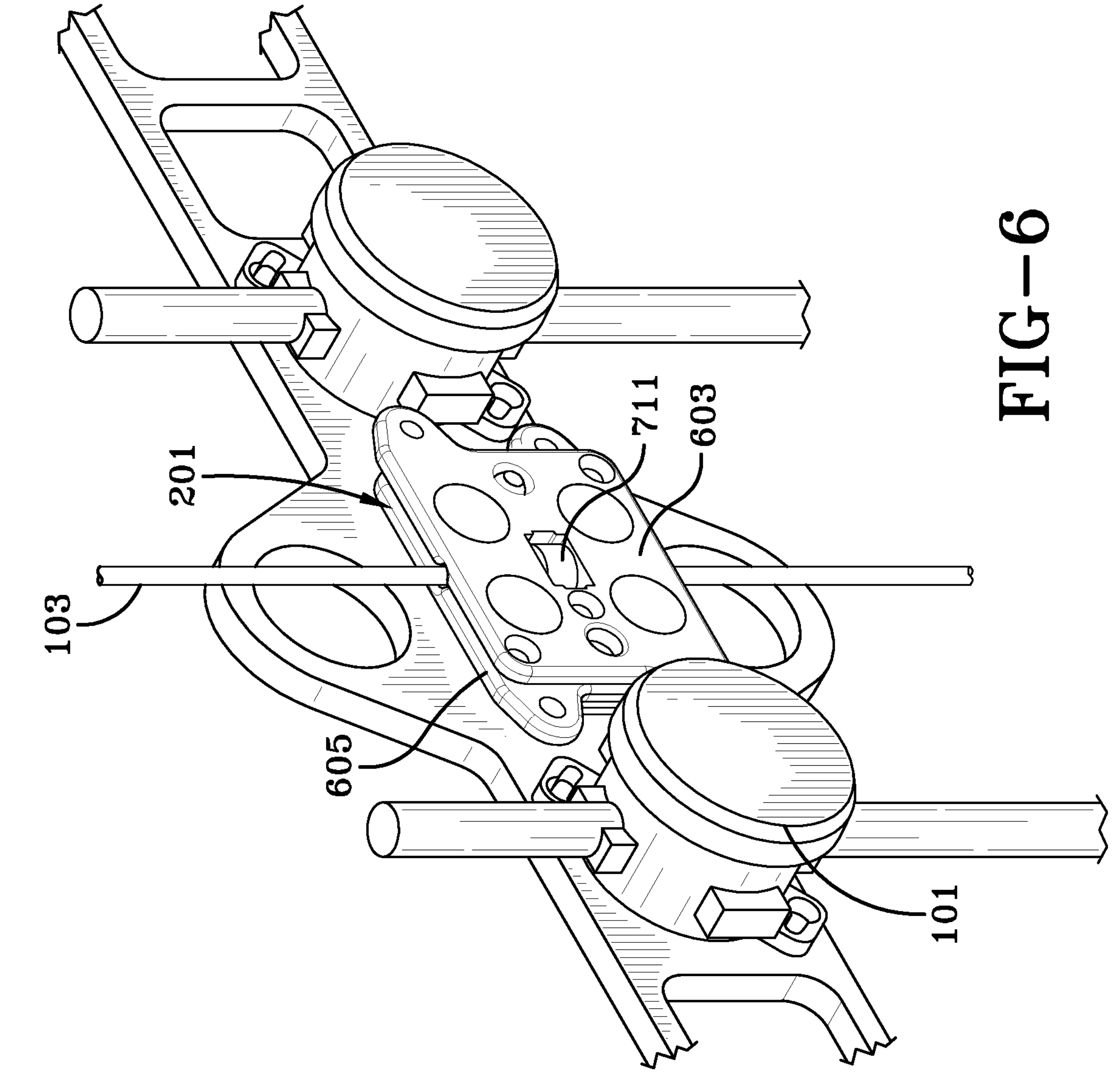
FIG. 6 illustrates an enlarged partial perspective view of another exemplary embodiment of a video display system.
Figure 8:
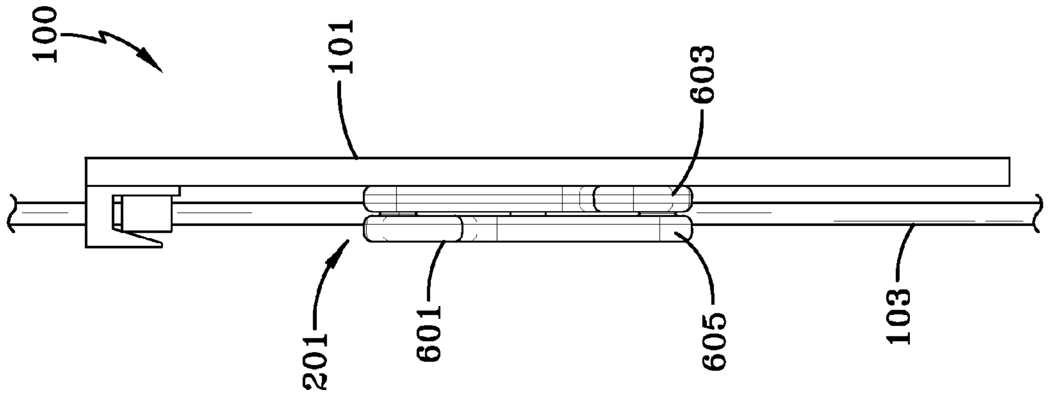
FIG. 8 illustrates a partial perspective view of another exemplary embodiment of a video display system.
Figure 7:
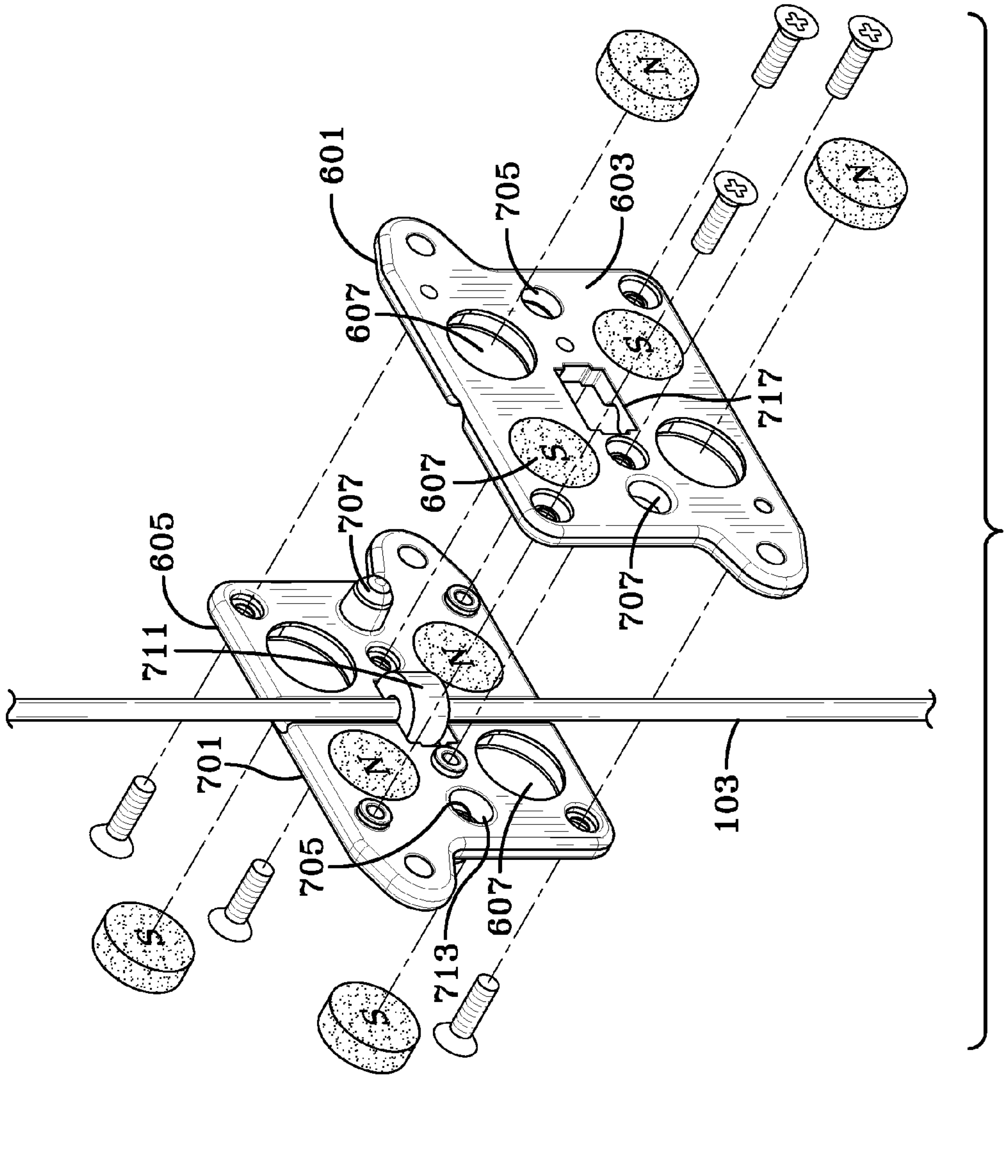
FIG. 7 illustrates an enlarged exploded partial perspective view of another exemplary embodiment of clipping mechanism.

Referring to FIGS. 6 through 8, the coupling device can be clipping mechanism 601. Clipping mechanism 601 can be engaged to flexible support 103 and display device 101 at first location 201 on display device 101. Clipping mechanism 601 can be arranged to connect flexible support 103 to display device 101 and disposed for allowing a lattice of display devices 101 to be clipped onto flexible support 103. Clipping mechanism 601 includes a first mating portion 603 and a second mating portion 605 that engage each other and provide connecting support. In one embodiment, clipping mechanism 601 may be configured to permit engagement and support of weight of display device 103. Clipping mechanism 601 may include latches, clips, hooks, or other interlocking features that provide additional support. In addition, clipping mechanism 601 may include a quick connect or otherwise manually operable connections that are easily engaged and disengaged. First mating portion 603 attaches to flexible support 103 at first location 201. The attachment may include any suitable attachment method for attaching rotatable bodies to wires and/or cables. In one embodiment, the first mating portion 603 is rotatably mounted about a ring clamp 711 or other clamping device capable of selectively mounting to flexible support 103. Ring clamp 711 immovably engages the flexible support 103 by set screws or a similar device. First mating portion 603 engages ring clamp 711 and is rotatable around flexible supports 103. When the second mating portion engages the first mating portion 603, the weight of the display device 101 is supported by the flexible support 103 at a first location at the ring clamp 711.

Referring to FIGS. 7 and 8, the coupling device can be one or more clipping members 601. Clipping member 601 can be engaged to flexible support 103 and display device 101 at first location 201 on display device 101. In one embodiment, clipping member 601 may include interlocking features to provide additional support. Clipping member 601 may include an interlocking feature 707, an interlocking receiving opening 705, and other features. In another embodiment, clipping member 601 may be a magnetic coupling member 701. Clipping member 601 may include magnets 607 that attract and engage corresponding magnets on display device 101, on flexible structure 103, and/or on another clipping member 601. Clipping member 601 may be machined, cast or otherwise formed of plastic or other non-magnetic material. Clipping member 601 may be made of other materials that permit magnetic forces to magnetically attract and/or attach to other surfaces or structures. In another embodiment, first mating portion 603 may be rotated around flexible support 103. In one embodiment, clipping member 601 can be engaged to flexible support 103 and display device 101 at a second location on display device 101, on a second display device 101, and/or on a second flexible support 103.

In one embodiment, interlocking feature 707 may be received by the interlocking receiving opening 705. In other embodiments, clipping member 601 may include other configurations of interlocking features 707 and/or interlocking receiving openings 705. Alternatively, the clipping member 601 may have no interlocking feature 707 and/or no interlocking receiving opening 705. Interlocking receiving opening 705 may be a recess or opening with one or more sides 713 forming a sloping geometry configured to correspond with the geometry of one or more side walls 715 of interlocking feature 707. Clipping member 601 can be configured to interlock or otherwise engage with substantially identical corresponding clipping member 601 or dissimilar clipping members 601 having corresponding interlocking features 707 and/or interlocking receiving openings 705. Magnetic clipping members 601 may be configured to correspond with other magnetic clipping members 601 and/or features of non-magnetic clipping members 601.

Clipping members 601 can include through-opening 717 configured to permit a wire, rope, circular metal, or other suitable fastener to be inserted through through-opening 717. Through-opening 717 can correspond to another through-opening 717 in another identical clipping member 601. When clipping members 601 are interlocked or otherwise engaged, through-openings 717 may used for the purpose of further securing clipping members 601 to each other by metal wires being pushed through the through-opening 717 and attached on each side of through-opening 717. Through-opening 717 in conjunction with suitable fasteners can engage flexible support 103 thereby stabilizing system and/or permitting rotation around flexible support 103.

Clipping member 601 can be magnetically attractive by inclusion of one or more magnets. Magnetic clipping member 601 may include recesses configured to house the magnets. In another embodiment, magnetic clipping member 601 can omit interlocking feature 707 and engage another clipping member 601 almost primarily by the magnets. In one embodiment, the magnets 607 are arranged in an arrangement that attracts and positions the first mating portion 603 and second mating portion 605. For example, a set of magnets arranged in a north-south-north polarity configuration which corresponds to a set of magnets in south-north-south polarity configuration. In other embodiments, multiple sets of magnets 607 may be used.

Interlocking feature 707 may correspond with the interlocking receiving opening 705. Clipping member 601 may be interlocked with a corresponding clipping member 601 by inserting interlocking feature 707 into interlocking receiving opening 705 of the corresponding clipping member 601. Interlocking feature 707 of the corresponding clipping member 601 may be interlocked with the interlocking receiving opening 705 thereby permitting interlocking feature 707 to be visible through interlocking receiving opening 705.

Figure 10:
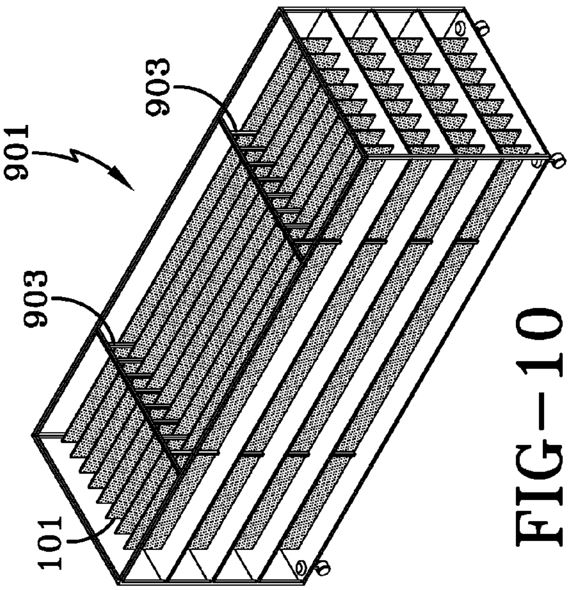
FIG. 10 illustrates a perspective view an exemplary embodiment of a video display system including a cart of storage or transportation.
Figure 9:
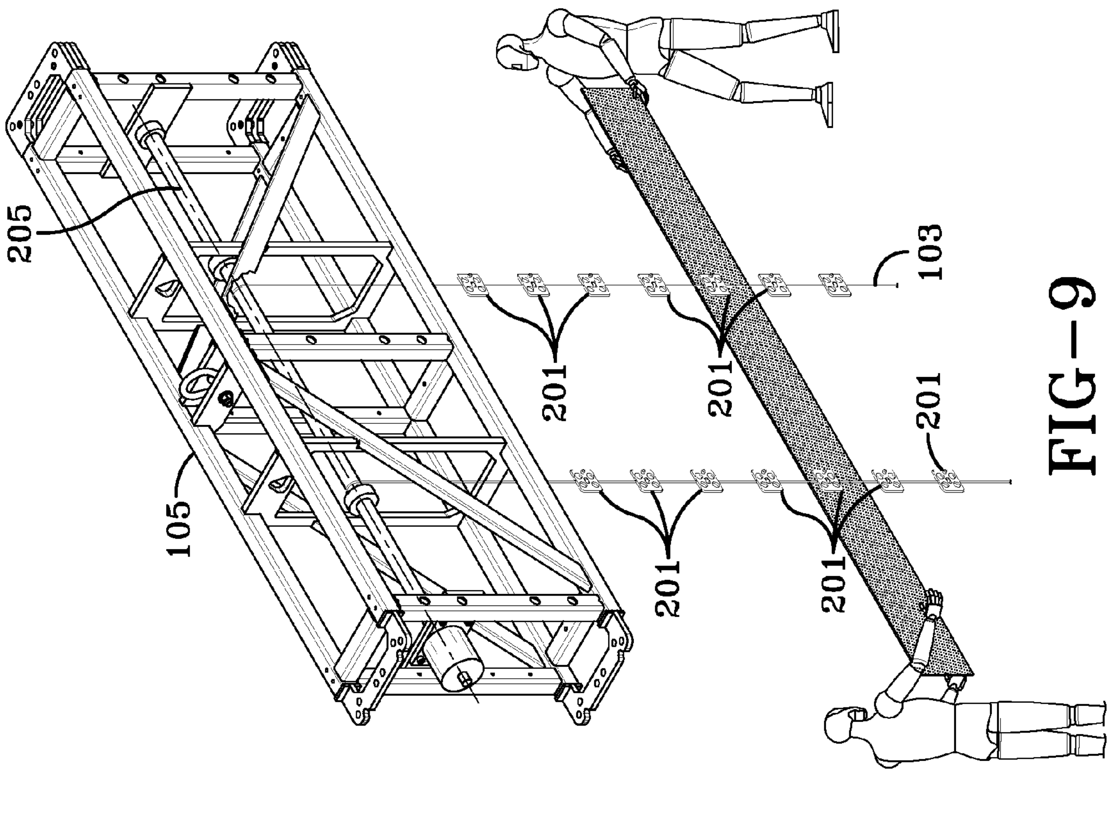
FIG. 9 illustrates a perspective view of another exemplary embodiment of a video display system.

Referring to FIGS. 9 and 10, cart 901 can be configured for receiving system 100. Cart 901 can be a cuboid structure having four walls and a bottom sized for receiving display device 101. In one embodiment where display device 101 is a panel, cart 901 can be sized for the panel to be suspended from members 903 extending through at least a portion of the interior of cart 901. In this embodiment, a plurality of display devices 101 may be inserted into cart with each display device detachably engaging members 903 of cart 901 by clipping mechanism 601 and/or flexible support 103. Inserts (not shown) can be inserted between display devices 101 when display devices 101 are being stored in cart 901. In one embodiment, cart 901 may include a plurality of levels or shelves permitting display devices 101 to be suspended in each of the levels. In one embodiment, the advancing by winding mechanism 205 may selectively permit display devices 101 to be inserted into cart 901. In another embodiment, display devices 101 may be folded compactly into cart 901 for more consolidated storage or transportation while flexible support 103 and/or the coupling device remain attached to display devices 101. In one embodiment, display device 101 may be lifted from cart 901 while manually or automatically disengaging members 903 of cart 901.

While only certain features and embodiments of the invention have been shown and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A method of arranging a video display system, the method comprising:

engaging a flexible support with a first coupling device, the flexible support having a longitudinal extent and a lateral extent perpendicular to its longitudinal extent and having an upstream portion securable to an architectural member at a height above a reference surface such that the flexible support will be in a suspended disposition with at least a portion of its longitudinal extent intermediate the upstream portion and a downstream portion extending vertically and the flexible support having a dimensionally varied portion longitudinally intermediate its upstream portion and its downstream portion formed with a first ring clamp, a second ring clamp and a third ring clamp, each of the first ring clamp, the second ring clamp and the third ring clamp including a lateral cross-section area that has a greater lateral dimension relative to a maximum lateral dimension of an adjacent upstream and downstream portion of the flexible support, wherein the first ring clamp is positioned at a first location intermediate the upstream portion and the downstream portion, the second ring clamp is positioned a second location between the first location and the downstream portion, and the third ring clamp is positioned at a third location between the second location and the downstream portion;

disposing a first display device at a support at which the first display device can be loaded onto the flexible support to thereafter be supported on the flexible support by the first coupling device that engages the flexible support with an engaging portion having a lateral dimension configured relative to the enlarged dimension lateral cross sectional area of the first ring clamp of the flexible support so as to be intercept able at a top face of the first ring clamp in a manner which precludes the first coupling device from traveling downstream beyond the top face of the first ring clamp;

moving at least one of the flexible support and the support relative to one another such that a second display device can be loaded at the support onto the flexible support to thereafter be supported on the flexible support by a second coupling device in engagement with the flexible support;

positioning the first display device after it has been loaded on the flexible support such that the first display device exerts a force in the downstream direction on the enlarged dimension lateral cross-section area of the ring clamp of the flexible support at the top face of the first ring clamp; and at the support, engaging the second display device on the flexible support such that, as a sufficient force in the downstream direction is applied on the second display device, at least a portion of the weight of the second display device will thereafter be supported on the flexible support via the second coupling device, the engagement of the second display device and the flexible support occurring only after the step of positioning the first display device after it has been loaded on the flexible support, and the second coupling device engaging the flexible support with an engaging portion having a lateral dimension configured relative to an enlarged dimension lateral cross-section area of the second ring clamp of the flexible support so as to be interceptable at a top face of the second ring clamp by the enlarged dimension lateral cross-section area of the second ring clamp of the flexible support in a manner which precludes the second coupling device from traveling downstream beyond the top face of the second ring clamp, wherein the first display device is detachable from the first location of the flexible support and re-attachable at the third location on the flexible support in which the third location is between the second location and the downstream portion while the second display device is maintained at the second location.

2. The method according to claim 1, wherein each engaging portion of the each corresponding coupling device includes a travel stop component disposable between a blocking disposition and a non-blocking disposition such that, in the event that the dimensionally varied portion of the flexible support has a relatively enlarged lateral cross-section, the travel stop component in its blocking disposition forms a lateral cross-sectional area narrower than the dimensionally varied portion of the flexible support having its relatively enlarged lateral cross-section, and, in the event that the dimensionally varied portion of the flexible support has a relatively reduced lateral cross-section, the travel stop component in its blocking disposition forms a lateral cross-sectional area narrower than the adjacent downstream portion of the flexible support, and the travel stop component, in its non-blocking disposition, does not preclude each corresponding coupling device from traveling downstream below the respective one of the dimensionally varied portion of the flexible support having a relatively enlarged lateral cross-section or the adjacent downstream portion of the flexible support.

3. The method according to claim 1, wherein each coupling device includes a first counterpart portion and a second counterpart portion, the first counterpart portion and the second counterpart portion being releasably connectable to one another and operatively connected to the engaging portion of a corresponding coupling device such that, when the first counterpart portion and the second counterpart portion are connected to one another in a manner in which a portion of the longitudinal extent of the flexible support is located between the first counterpart portion and the second counterpart portion, the travel stop component is in its blocking disposition.

4. The method according to claim 1 and further comprising a releasable interlock element, the releasable interlock element being operable to releasably maintain the first counterpart portion and the second counterpart portion of each coupling device in a fastening ready position with one another.

5. The method according to claim 4 and further comprising a fixture element disposable between a fastening disposition in which it secures a corresponding coupling device against inadvertent dislodgement from the flexible support and a non-fastening disposition in which the corresponding coupling device can be removed from engagement with the flexible support, and the releasable interlock element being operable to releasably maintain the first counterpart portion and the second counterpart portion of the corresponding coupling device in the fastening ready position with one another while the fixture element is manipulated from its non-fastening disposition into its fastening disposition.

6. The method according to claim 5, wherein the fixture element includes a fastener having a threaded portion and a compatibly configured threaded receptacle for threadingly receiving the threaded portion of the fastener.

7. The method according to claim 4, wherein the interlock element includes a projection on the first counterpart portion of the corresponding coupling device and a compatibly configured recess secured to the second counterpart portion of the corresponding coupling device and operable to receive therein the projection on the first counterpart portion of the corresponding coupling device.

8. The method according to claim 4, wherein the interlock element includes a pair of initial hold pieces movable relative to one another between a start position and an end position and the initial hold pieces being operatively engageable with one another in a manner such that the initial hold pieces have engaged one another at the latest upon the disposition of the initial hold pieces into their end position in connection with a movement from their start position to their end position, the thus-engaged initial hold pieces operating to resist displacing movement of the first and second counterpart portions of the coupling device relative to one another that would otherwise result in a release of the first and second counterpart portions from the flexible support if not resisted.

9. The method according to claim 8, wherein the dimensionally varied portion of the flexible support has an enlarged lateral cross-section wherein the enlarged lateral cross-section has a predetermined angular extent as viewed relative to the longitudinal extent of the flexible support and the travel stop component of the engaging portion of the corresponding coupling device includes a cut-out formed in at least one of the first counterpart portion of the coupling device and the second counterpart portion of the coupling device and the cut-out of the travel stop component of the engaging portion of the coupling device is operable to receive a respective angular portion of the enlarged lateral cross-section of the flexible support inserted thereinto.

10. The method according to claim 8, wherein the dimensionally varied portion of the flexible support includes a lateral enlargement extending completely angularly relative to the longitudinal extent of the flexible support.

11. The method according to claim 8, wherein the initial hold pieces include a magnetic portion secured to the first counterpart portion of the coupling device and another magnetic portion secured to the second counterpart portion of the coupling device having an opposite polarity to the polarity of the magnetic portion secured to the first counterpart portion of the coupling device.

12. The method according to claim 8, wherein the flexible support includes power and/or signal functionality.

13. The method according to claim 12, wherein the flexible support includes fiber optic or copper-based wires or cables, or Ethernet cable.

14. The method of arranging a video display system according to claim 1, wherein the step of disposing a first display device at a support includes disposing a display device having LED components at a support.

15. The method of arranging a video display system according to claim 14 and further comprising lowering the first display device and the second display device in a manner in which the second display is lowered into a container such that the weight of the second display is substantially fully supported by the container and the flexible support is substantially relieved of having the weight of the second display applied thereon while substantially the entirety of the weight of the first display device continues to be supported by the flexible support and thereafter the first display is lowered into the container such that the weight of the first display is substantially fully supported by the container and the flexible support is substantially relieved of having the weight of the first display applied thereon.

16. The method of arranging a video display system according to claim 1 and further comprising disengaging all coupling devices from their corresponding display devices and the flexible support.

17. The method of arranging a video display system according to claim 1 and further comprising connecting the flexible support to a controller for providing signals to the display device, the display device including an independent power source.

18. The method of arranging a video display system according to claim 1 and further comprising controlling the display activity of the display device with a controller, the controller being integrated into the controls of a theatrical performance control module.

* * * * *